Patented June 3, 1941

UNITED STATES PATENT OFFICE 2,244,244

PROCESS FOR PRODUCING o,o'-DIHYDROXYDIPHENYL

Wilhelm Deseke, Berlin, Germany, assignor to the firm Ruetgerswerke-Aktiengesellschaft, Berlin, Germany No Drawing. Application April 26, 1939, Serial No. 270,251. In Germany June 22, 1938

3 Claims. (Cl. 260—620)

This invention relates to the conversion of diphenylene-oxide into diphenol and it has particular relation to the recovery of o,o'-dihydroxydiphenyl by the action of caustic potash on diphenylene-oxide.

According to Kraemer and Weissgerber (Berichte der Deutsche Chemische Gesellschaft 34 (1901), p. 1665) diphenylene-oxide can be converted into biphenol by melting with caustic potash. This statement, however, was revoked later, and it was found by Bothe, and Weissgerber and Seidler, that it is not possible to split up diphenylene-oxide by means of caustic potash, even if the reaction is carried out, as was suggested earlier, in the presence of phenanthrene. (See, Bothe, Dissertation, Göttingen, 1908; Weissgerber and Seidler, Berichte der Deutsche Chemische Gesellschaft, 60 (1927) p. 2090.)

I have now found that diphenylene-oxide can be split up easily and with satisfactory yields, if it is melted in the presence of cyclic compounds containing active hydrogen which is linked to a carbon or nitrogen atom, and replaceable by metals, for instance, potassium. If such compounds for instance, cyclopentadiene, indene, fluorene, pyrrole, indole, and carbazole, are heated with caustic potash, water is split off, and the corresponding potassium compound is formed. By melting diphenylene-oxide with caustic potash in the presence of such compounds a mass is obtained which contains the conversion products of diphenylene-oxide in mixture with the potassium compound of the added substance. This substance can be easily recovered from the mass by treatment with water, and can be used again for the conversion of diphenylene-oxide.

*Example 1.*—200 grams of diphenylene-oxide are heated with 20 grams of carbazole and 200 grams of caustic potash to 250-270° C. during 1¾ hours. The heating is preferably carried out in a copper vessel which is provided with an agitator, and a reflux condenser, which allows the vapors of the water formed to escape, but condenses vapors of diphenylene-oxide as much as possible. Diphenylene-oxide which escapes through the condenser, can easily be recovered. The reaction mass is then comminuted and dissolved with water, whereby carbazole is obtained as a residue. By precipitating the aqueous solution by the addition of an acid, and crystallizing the precipitate from benzene, 145 grams of pure o,o'-dihydroxydiphenyl are obtained.

*Example 2.*—10 grams of diphenylene-oxide are heated with 2.5 grams of fluorene, and 10 grams of caustic potash to about 275° C. during 2 hours in the manner described in Example 1. The product obtained is pulverized, and treated with water and benzene. The water dissolves the potassium compound of dihydroxydiphenyl, and causes decomposition of the fluorene-potassium-compound. The unconverted diphenylene-oxide and fluorene are dissolved in benzene. The aqueous solution is treated as described in Example 1, whereby 7.2 grams of pure o,o'-dihydroxydiphenyl are obtained.

*Example 3.*—200 grams of diphenylene-oxide and 20 grams of indole are heated with 200 grams of caustic potash to about 250° C. during 3 hours. By treating the reaction mass in the manner described in Example 2, 115 grams of pure o,o'-dihydroxydiphenyl are obtained.

The proportions of the compounds used in carrying out my present invention may vary within wide limits. It has been found that about equal amounts of diphenylene-oxide and caustic potash may preferably be used and that an addition of about 20-30% of the above mentioned cyclic compounds, such as carbazole, fluorene, etc., is sufficient to secure a satisfactory conversion of the diphenylene-oxide. For carrying out the conversion, temperatures of about 250°-275°, and heating periods of about 1¾-3 hours have proved particularly satisfactory. Other proportions, temperatures and heating periods, may, however, also be used in carrying out my present process.

I claim:

1. A process for producing o,o'-dihydroxydiphenyl from diphenylene-oxide, which comprises melting a mixture of diphenylene-oxide with caustic potash and a cyclic compound containing active hydrogen replaceable by potassium, said cyclic compound being selected from the group consisting of indene, fluorene, carbazole, cyclopentadiene, pyrrole and indole.

2. A process for producing o,o'-dihydroxydiphenyl from diphenylene-oxide, which comprises heating to a temperature between 250° and 275° C. a mixture of diphenylene-oxide with caustic potash and a cyclic compound containing active hydrogen replaceable by potassium, said cyclic compound being selected from the group consisting of indene, fluorene, carbazole, cyclopentadiene, pyrrole and indole.

3. A process for producing o,o'-dihydroxydiphenyl from diphenylene-oxide, which comprises heating to a temperature between 250° and 275° C. during 1¾ to 3 hours a mixture of diphenylene-oxide with caustic potash and a cyclic compound containing active hydrogen replaceable by potassium, said cyclic compound being selected from the group consisting of indene, fluorene, carbazole, cyclopentadiene, pyrrole and indole; dissolving the mass obtained with water, separating the aqueous solution formed from the undissolved residue, and precipitating said aqueous solution with an acid.

WILHELM DESEKE.